United States Patent Office 3,396,165
Patented Aug. 6, 1968

3,396,165
9 - AMINOMETHYL - 3,8 - DILOWERALKYL - 10-
HYDROXY - 5 - OXO - 1,2,3,4 - TETRAHYDRO-
BENZOPYRANO[3,4-c]PYRIDINES
James W. Bolger, Canoga Park, Calif., assignor to Rexall
Drug and Chemical Company, Los Angeles, Calif., a
corporation of Delaware
No Drawing. Filed June 14, 1965, Ser. No. 463,858
7 Claims. (Cl. 260—247.2)

ABSTRACT OF THE DISCLOSURE

This invention is directed to 9-mono and diloweralkyl-aminomethyl substituted 3,8-dimethyl-10-hydroxy-5-oxo-1,2,3,4 - tetrahydrobenzopyrano[3,4-c]pyridines and their 9-pyrrolidinomethyl-, 9-piperidinomethyl-, 9-morpholinomethyl-, and 9-(4-methylpiperazino)-methyl substituted equivalents. These compounds have activity as analgesic and hypotensive agents. The compounds are prepared by the Mannich reaction.

This invention relates to compositions of matter classified in the field of chemistry as substituted 10-hydroxy-benzo-pyranopyridines.

The invention sought to be patented is described as residing in the concept of a chemical compound having a molecular structure in which the 10-hydroxy-3,8-dilower alkyl - 5 - oxo - 1,2,3,4 - tetrahydrobenzopyrano[3,4 - c]-pyridine nucleus bears at the 9-position a diloweralkyl-aminomethyl radical, and the hereinafter described equivalents thereof.

As used throughout this application, the term "lower alkyl" embraces both straight and branched chain alkyl radicals containing 1 to 6 carbon atoms, for example methyl, ethyl, n-propyl, isopropyl, n-butyl, tert-butyl, n-amyl, sec-amyl, n-hexyl, 2-ethylbutyl, 2,3-dimethylbutyl and the like and the term "lower alkenyl" embraces straight and branched chain alkenyl radicals containing 2 to 6 carbon atoms, for example, vinyl, allyl, 1-butenyl, 1-hexenyl, 2,3-dimethyl-1-butenyl, 2-ethyl-1-butenyl and the like.

The tangible embodiments of this invention, both as free bases and in the form of their acid-addition salts, possess the inherent general physical properties of being solid crystalline materials. Elemental analysis, as well as ultraviolet and infrared spectral analysis data and nuclear magnetic resonance (NMR) data, taken together with the aforementioned physical properties, nature of the starting materials and mode of synthesis, positively confirm the structure of the compounds sought to be patented.

The tangible embodiments of this invention possess the inherent applied use characteristics of possessing signficant pharmacological activity without adverse toxicity an analgesic and hypotensive agents as determined by recognized and accepted pharmacological test procedures.

The manner and process of making and using the invention will now be generally described so as to enable one skilled in the art of chemistry to make and use the same as follows:

The preparation of the tangible embodiments of this invention is illustrated by the following reaction sequence:

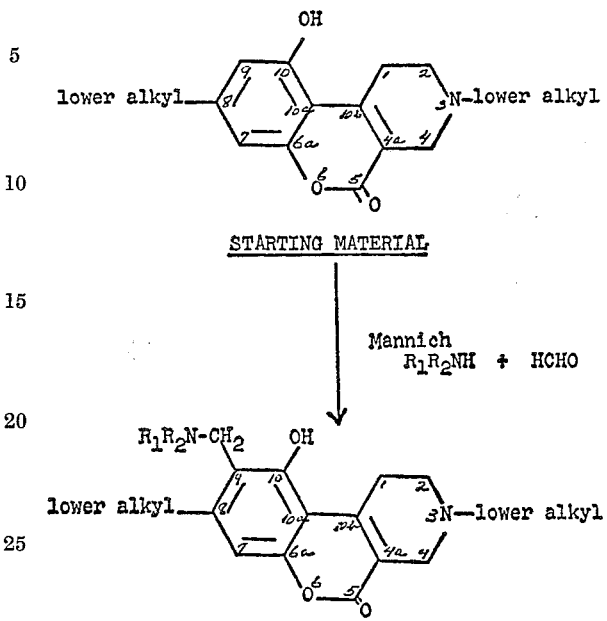

wherein —NR$_1$R$_2$ is diloweralkylamino or its hereinafter described equivalents.

In accordance with the hereinabove depicted reaction sequence a 5-oxo-3,8-diloweralkyl-10-hydroxy-1,2,3,4-tetrahydrobenzopyrano[3,4-c]pyridine is subjected to the well-known Mannich reaction, thereby to produce the 5-oxo - 9 - diloweralkylaminomethyl - 3,8 - diloweralkyl-10 - 1,2,3,4 - tetrahydrobenzopyrano[3,4 - c]pyridines which comprise the tangible embodiments of this invention. The reaction is carried out by treating the starting material with an appropriate diloweralkylamine, for example dimethylamine, diethylamine and the like, in substantially equimolar proportions, in the presence of a source of formaldehyde, for example paraformaldehyde, in an inert organic solvent such as, for example, ethanol, tetrahydrofuran and the like, at a temperature of up to the reflex temperature of the solvent. The product is recovered from the reaction mixture by conventional techniques of extraction, filtration, crystallization and the like.

The starting materials for the preparation of the tangible embodiments of this invention are known compounds that are readily prepared by conventional techniques of chemistry. The starting materials are described by Anker and Cook (J. Chem. Soc. 1946: 58–61) and are prepared by the condensation of N-methyl-3-carbethoxy-4-piperidone with orcinol in the presence of phosphorus oxychloride.

In carrying out the reaction, a monoloweralkylamine such as methylamine, ethylamine, isopropylamine and the like, a phenyl-loweralkylamine such as benzylamine, phenethylamine and the like, or a saturated cyclic organic base of the formula HNRR wherein each R is lower alkyl linked through a methylene bridge or a hetero-oxygen, nitrogen or sulfur atom and lower alkyl substituted derivatives thereof, such as pyrrolidine, piperidine, morpholine, piperazine, 2-methylmorpholine, 3-ethylpyrrolidine, N-methylpiperazine and the like are the full equivalents of the diloweralkylamine, yielding final products bearing —$NR_1R_2$ substitution corresponding to the reactant used which have the same utility as the final products utilizing a diloweralkylamine. In addition, lower aliphatic aldehydes of the formula RCHO wherein R is lower alkyl may be employed, such as acetaldehyde, propionaldehyde, butyraldehyde and the like, thereby to prepare final products wherein the methylene bridge linking the —$NR_1R_2$ radical with the 9-position of the nucleus bears lower alkyl substituent (R) which are the full equivalents to the final products bearing an unsubstituted methylene bridge.

Starting materials bearing one or more lower alkyl substituents at the 1, 2 and/or 4 position, and/or starting materials wherein the nitrogen atom of the pyridine ring bears a lower alkenyl radical in place of lower alkyl are prepared by the same techniques described in the Anker and Cook paper referred to hereinabove, such lower alkyl and/or N-lower alkenyl substituted starting materials being the full equivalents of the specific starting materials depicted in the hereinabove described reaction with a Mannich base, thereby resulting in final products bearing the same alkyl substitution at the 1, 2 and/or 4 position, and/or lower alkenyl substitution on the nitrogen atom of the pyridine ring, as in the starting materials. Such products have the same utility as the specific products depicted in the above reaction sequence and are included within hte scope of the tangible embodiments of this invention.

It has also been found that when the Mannich base and formaldehyde source are each present in the reaction mixture in a molar ratio of at least 2 moles to each mole of starting material, the resulting final product bears a diloweralkylamino radical or its above-described equivalents at both the 7- and 9-positions. Such disubstituted final products have the same utility as the mono-substituted products described hereinabove and are included within the scope of the tangible embodiments of this invention.

The tangible embodiments of this invention, in free base form, may, if desired, be converted into their non-toxic pharmaceutically acceptable acid-addition and quaternary ammonium salts. Salts which may be formed comprise, for example, salts with inorganic acids, such as the hydrochloride, hydrobromide, hydroiodide, sulfate, phosphate or the like. They may also comprise salts with organic acids, including monobasic acids such as the acetate or propionate, and especially those with hydroxy organic acids and polybasic acids, such as the citrate, tartrate, malate and maleate. Pharmaceutically, the salt will not be substantially more toxic than the compound itself and, to be acceptable, it should be able to be incorporated into conventional liquid or solid pharmaceutical media. Among the useful quaternary ammonium salts are those formed by such alkyl halides as methyl iodide, n-hexyl bromide and the like. Such pharmaceutically useful acid-addition and quaternary ammonium salts are the full equivalents of the bases from which they are derived and are included within the scope of this invention.

The tangible embodiments of this invention, either as free bases or in the form of a non-toxic pharmaceutically acceptable acid-addition or quaternary ammonium salt, can be combined with conventional pharmaceutical diluents and carriers to form such dosage forms as tablets, suspensions, solutions, suppositories and the like.

The best mode contemplated by the inventor for carrying out his invention will now be set forth as follows:

EXAMPLE 1

3,8 - dimethyl-9-dimethylaminomethyl-10-hydroxy-5-oxo-1,2,3,4-tetrahydrobenzopyrano[3,4-c]pyridine 3,8-dimethyl-10-hydroxy-5-oxo - 1,2,3,4 - tetrahydrobenzopyrano[3,4-c]pyridine (12.25 g., 0.05 mole), paraformaldehyde (1.5 g., 0.05 mole) and 35% aqueous dimethylamine (7.1 g., 10% excess) are stirred together in methanol (300 ml.) for 40 hours at about 23° C. The mixture is then filtered and the filtrate is concentrated in vacuo to a volume of 50 ml. The product crystallizes out and is recovered, after recrystallization from absolute ethanol, in a yield of 6.5 g. (43%) of pure compound, M.P. 178°–179° C.

*Analysis.*—Calculated for $C_{17}H_{22}N_2O_3$: C, 67.52%; H, 7.33%; N, 9.27%. Found: C, 67.20%; H, 7.05%; N, 9.60%.

The following examples illustrate the preparation of other tangible embodiments of this invention:

EXAMPLE 2

9-diethylaminomethyl-3,8-dimethyl-10-hydroxy-5-oxo-1,2,3,4-tetrahydrobenzopyrano[3,4-c]pyridine By the same procedure described in Example 1, 3,8-dimethyl-10-hydroxy-5-oxo - 1,2,3,4 - tetrahydrobenzopyrano[3,4-c]pyridine (12.25 g., 0.05 mole) is treated with diethylamine (0.04 g., 10% molar excess) in the presence of paraformaldehyde (1.5 g., 0.05 mole) to yield white to pale cream crystals, M.P. 128°–130° C.

*Analysis.*—Calculated for $C_{19}H_{26}N_2O_3$: C, 69.06%; H, 7.93%; N, 8.48%. Found: C, 68.77%; H, 7.73%; N, 8.30%.

EXAMPLE 3

3,8-dimethyl-10-hydroxy-5-oxo-9-pyrrolidinomethyl-1,2,3,4-tetrahydrobenzopyrano[3,4-c]pyridine By the same procedure described in Example 1, 3,8-dimethyl-10-hydroxy - 5 - oxo-1,2,3,4-tetrahydrobenzopyrano[3,4-c]pyridine (12.25 g., 0.05 mole) is treated with pyrrolidine (3.85 g., 0.055 mole) in the presence of paraformaldehyde (1.5 g., 0.05 mole) to yield, after recrystallization, 8.5 g. (52%) of cream-colored crystals, M.P. 172°–175° C.

*Analysis.*—Calculated for $C_{19}H_{24}N_2O_3$: C, 69.49%; H, 7.37%; N, 8.53%. Found: C, 69.59%; H, 7.68%; N, 8.88%.

EXAMPLE 4

3,8-dimethyl-10-hydroxy-5-oxo-9-piperidinomethyl-1,2,3,4-tetrahydrobenzopyrano[3,4-c]pyridine By the same procedure described in Example 1, 3,8-dimethyl-10-hydroxy-5-oxo - 1,2,3,4 - tetrahydrobenzopyrano[3,4-c]pyridine (12.25 g., 0.05 mole) is treated with piperidine (4.28 g., slight molar excess) in the presence of paraformaldehyde (1.5 g., 0.05 mole) to yield 11 g. (63%) of fine white needles, M.P. 160°–163° C.

*Analysis.*—Calculated for $C_{20}H_{26}N_2O_3 \cdot \frac{1}{3}H_2O$: C, 68.95%; H, 7.70%; N, 8.05%. Found: C, 69.10%; H, 7.70%; N, 8.30%.

EXAMPLE 5

3,8-dimethyl-10-hydroxy-9-(4-methylpiperazinomethyl)-5-oxo-1,2,3,4-tetrahydrobenzopyrano[3,4-c]pyridine By the same procedure described in Example 1, 3,8-dimethyl - 10 - hydroxy-5-oxo-1,2,3,4-tetrahydrobenzopyrano[3,4-c]pyridine (12.25 g., 0.05 mole) is treated with N-methylpiperazine (5.5 g., approx. 10% molar excess) in the presence of paraformaldehyde (1.5 g., 0.05 mole) to yield 11 g. of product which upon recrystallization from absolute ethanol gave 9 g. (50%) of pure fine crystals, M.P. 188°–190° C.

*Analysis.*—Calculated for $C_{20}H_{27}N_3O_3$: C, 67.20%; H, 7.61%; N, 11.76%. Found: C, 66.45%; H, 7.57%; N, 12.18%.

EXAMPLE 6

3,8-dimethyl-10-hydroxy-9-morpholinomethyl-5-oxo-1,2,3,4-tetrahydrobenzopyrano[3,4-c]pyridine By the same procedure described in Example 1, 3,8-dimethyl - 10 - hydroxy-5-oxo-1,2,3,4-tetrahydrobenzopyrano[3,4-c]pyridine (12.25 g., 0.05 mole) is treated with morpholine (4.35 g.) in the presence of paraformaldehyde (1.5 g., 0.05 mole) to yield 6 g. of pink crystals which upon recrystallization from absolute ethanol yield 5.2 g. (32%) of white crystalline product, M.P. 183°–188° C.

*Analysis.*—Calculated for $C_{19}H_{24}N_2O_4$: C, 66.26%; H, 7.02%; N, 8.13%. Found: C, 66.31%; H, 7.09%; N, 8.49%.

The subject matter which the applicant regards as his invention is particularly pointed out and distinctly claimed as follows.

I claim:

1. 3,8 - dimethyl-9-dimethylaminomethyl-10-hydroxy-5-oxo-1,2,3,4-tetrahydrobenzopyrano[3,4-c]pyridine.
2. 9 - dimethylaminomethyl-3,8-dimethyl-10-hydroxy-5-oxo-1,2,3,4-tetrahydrobenzopyrano[3,4-c]pyridine.
3. 3,8-dimethyl-10-hydroxy-5-oxo-9-pyrrolidinomethyl-1,2,3,4-tetrahydrobenzopyrano[3,4-c]pyridine.
4. 3,8 - dimethyl-10-hydroxy-5-oxo-9-piperidinomethyl-1,2,3,4-tetrahydrobenzopyrano[3,4-c]pyridine.
5. 3,8 - dimethyl - 10-hydroxy-9-(4-methylpiperazinomethyl) - 5 - oxo - 1,2,3,4-tetrahydrobenzopyrano[3,4-c]pyridine.
6. 3,8 - dimethyl - 10-hydroxy-9-morpholinomethyl-5-oxo-1,2,3,4-tetrahydrobenzopyrano[3,4-c]pyridine.
7. A compound of the formula

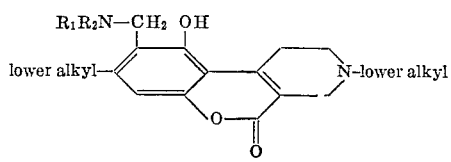

wherein $NR_1R_2$ is a member selected from the group consisting of monoloweralkylamino, diloweralkylamino, pyrrolidino, piperidino, piperazino, morpholino, 2-methylmorpholino, 3-ethylpyrrolidino and N-methylpiperazino.

No references cited.

NICHOLAS S. RIZZO, *Primary Examiner.*

JOSE TOVAR, *Assistant Examiner.*

UNITED STATES PATENT OFFICE
CERTIFICATE OF CORRECTION

Patent No. 3,396,165                                August 6, 1968

James W. Bolger

It is certified that error appears in the above identified patent and that said Letters Patent are hereby corrected as shown below:

Column 2, line 38, after "10-" insert -- hydroxy- --. Column 5, line 22, "dimethylaminomethyl" should read -- diethylaminomethyl --.

Signed and sealed this 30th day of December 1969.

(SEAL)
Attest:

Edward M. Fletcher, Jr.                        WILLIAM E. SCHUYLER, JR.
Attesting Officer                                     Commissioner of Patents